United States Patent Office 3,361,626
Patented Jan. 2, 1968

3,361,626
METHOD OF INHIBITING BACTERIA WITH TETRAMIC ACID AND DERIVATIVES THEREOF
Stanton A. Harris, Westfield, and Charles O. Gitterman, Cranford, N.J., assignors to Merck & Co., Inc., Rahway, N.J., a corporation of New Jersey
No Drawing. Original application Apr. 16, 1964, Ser. No. 360,416, now Patent No. 3,299,095, dated Jan. 17, 1967. Divided and this application May 2, 1966, Ser. No. 546,500
5 Claims. (Cl. 167—33)

ABSTRACT OF THE DISCLOSURE

Tetramic acids and salts thereof having an alkyl, benzyl or phenyl radical at the 1-position, an acetyl, carboxamide or carbethoxy radical at the 3-position, and an alkyl, haloalkyl or aryl radical at the 5-position. They have antibacterial activity, and are prepared from a substituted α-amino acid by a four step process concluding with the ring closure of an N-disubstituted amino acid ester.

---

This application is a division of co-pending application U.S. Ser. No. 360,416, filed Apr. 16, 1964, now U.S. Patent No. 3,299,095.

This invention relates to novel amino acid derivatives and more particularly to novel tetramic acids and salts thereof. Specifically it relates to novel tetramic acids substituted in the 1-, 3-, and 5-positions and salts thereof.

The compounds of the present invention have the following structural formula:

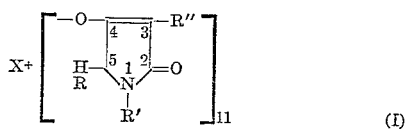

where R is alkyl, haloalkyl, or aryl, R' is benzyl, phenyl, or alkyl, R'' is acetyl, carboxamido, or carboethoxy, X is hydrogen or a metal cation, and $n$ is a whole number corresponding to the valency of X.

Representative of the compounds within the generic formula appearing above are 1-methyl-3-acetyl-5-sec. butyl tetramic acid, 1-benzyl-3-acetyl-5-isopropyl tetramic acid, 1,5-diphenyl-3-acetyl tetramic acid, 1-benzyl-3-acetyl-5-(3'-amyl) tetramic acid, 1-benzyl-3-acetyl-5-sec. butyl tetramic acid, 1-benzyl-3-acetyl-5-(3'3'3'-trifluoro-n-propyl) tetramic acid, 1-benzyl-3-acetyl-5-(n-amyl) tetramic acid, 1-benzyl-3-acetyl-5-phenyl tetramic acid, 1-benzyl-3-carboxamido-5-sec. butyl tetramic acid, 1-benzyl-3-carboethoxy-5-sec. butyl tetramic acid, and the sodium, potassium, calcium, magnesium, copper, and barium salts of the foregoing, such as, for example, potassium-1-methyl-3-acetyl-5-sec. butyl tetramate, sodium-1-benzyl-3-acetyl-5-isopropyl teramate, sodium-1-benzyl-3-acetyl-5-sec. butyl tetramate, potassium-1-methyl-3-acetyl-5-sec. butyl tetramate, copper-1-benzyl-3-carboethoxy-5-sec. butyl tetramate, magnesium-1,5-diphenyl-3-acetyl tetramate, and the like. The compounds may be either in the L form, D form, or mixtures of these.

The preferred compounds of the present invention are those wherein R' is benzyl, R'' is acetyl, and R is lower alkyl or halo lower alkyl, such as the following: 1-benzyl-3-acetyl-5-sec. butyl tetramic acid, 1-benzyl-3-acetyl-5-n-hexyl tetramic acid, 1-benzyl-3-acetyl-5-(3'-amyl) tetramic acid, 1-benzyl-3-acetyl-5-isopropyl tetramic acid, 1-benzyl-3-acetyl-5-(3'3'3'-trifluoro-n-propyl) tetramic acid, 1-benzyl-3-acetyl-5-(n-amyl) tetramic acid, and the sodium and potassium salts thereof.

The compounds of the present invention are prepared from the appropriately substituted amino acid in accordance with the flow diagram appearing hereinafter. The starting material is an amino acid of the following formula:

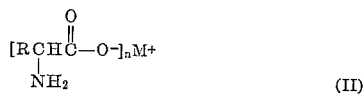

where M is a metal ion, preferably an alkali metal or alkaline earth metal, and $n$ is a whole number equal to the valency of M. The following flow diagram indicates the reaction steps starting with the amino acid as the sodium salt.

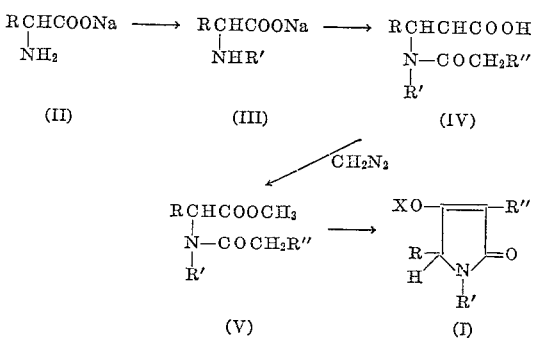

As the foregoing diagram indicates, the series of steps introduces into the starting amino acid the R' and R'' groups.

With respect to the amino acid starting material, where R is sec. butyl, isoleucine is the starting material; where R is isopropyl, valine is used; where R is 3'-amyl, 3,3-diethyl alanine is the starting material; where R is 3'3'3'-trifluoro-n-propyl, the starting material is 5,5,5-trifluoro norvaline and so forth. In some instances the selection of the starting material may also be made on the basis of it already containing an appropriate R' group, thereby eliminating the first step shown in the flow sheet. For example, the starting material for 1-benzyl-3-acetyl-5-isopropyl tetramic acid is conveniently N-benzyl valine; for 1-methyl-3-acetyl-5-sec. butyl tetramic acid, the starting amino acid is N-methyl isoleucine. Thus, it can be seen that where possible and where practicable the starting material may be one which includes both R and R' initially. Furthermore, the starting materials need not be in any particular form with respect to optical activity. Thus, either D or L forms, or mixtures of these may be employed.

For starting materials having no N-substituent, the first step of the process involves introducing at the nitrogen the R' substituent. In the case of introducing the benzyl radical, the amino acid, preferably in the form of the sodium or potassium salt, is reacted with benzaldehyde in a solvent, and the resulting mixture hydrogenated at room temperature using, for example, palladium on carbon as a catalyst. Low hydrogen pressure, of the order of 0–40 p.s.i.g., is suitable. When R' is an alkyl radical from ethyl and higher, such radical may be introduced by employing the appropriate aldehyde. When R' is methyl or phenyl, the appropriate amino acid starting material containing the groups is employed and may be prepared by known techniques; in which case the benzylation or alkylation above described is not necessary.

The compound containing the R' group is next treated preferably at from 0–15° C., and again preferably as the sodium or potassium salt, to introduce the R'' radical. When R'' is acetyl, this treatment involves reacting the N-substituted amino acid with diketene in the presence of a base such as sodium hydroxide, potassium hydroxide and the like. This serves to introduce the acetoacetyl radical at the N-atom of amino acid. After acidification to convert to the free acid, the acetoacetyl derivative may be recovered from the reaction mass by extracting it into ether. When R″ is carboethoxy, carbethoxy acetyl chloride is used in place of diketene.

The next step involves esterification of the N-acetoacetyl free acid using diazomethane, preferably in excess, and in the presence of a suitable solvent such as ether, diethyl ether, and the like, and preferably at 0–20° C. The product obtained thereby is the methyl ester of the N-disubstituted amino acid starting material and is obtained as an oily residue from the reaction mixture after evaporation of the solvent.

The methyl ester obtained above is then treated to effect ring closure to form compounds I. This is achieved by treating the ester with an alkaline condensing agent such as sodium, potassium, magnesium alkoxides, and the like with sodium and potassium methoxide being preferred, at a temperature preferably in the range of from 70° C. to 100° C. in the presence of a suitable solvent such as benzene, toluene, and the like. The product, compounds I, is obtained as the metal salt corresponding to the metal present in the condensing agent. They may be converted to the free acid by acidifying the salt in an aqueous solution. The soluble metal salts may be converted to insoluble metal salts such as the copper salt, by the addition of appropriate metal salt solutions, or converted to free acid form by acidification. The free acids frequently can be crystallized from solvents such as ether, ethyl acetate, benzene petroleum ether, and mixtures thereof and the like.

The compounds of the present invention have been found to be effective as antibacterial agents, against a wide variety of microorganisms. They are preferably used in the form of their water soluble sodium or potassium salts in such applications. The examples hereafter show a wide variety of microorganisms which are susceptible to the compounds of the invention, included among which are *Escherichia coli, Proteus vulgaris, Staphylococcus aureus, Bacillus subtilis, Staphlococcus aureus, Bacillus megaterium, Streptococcus faecalis,* and *Salmonella gallinarum.*

The following examples are given for the purpose of illustration only and not by way of limitation.

*Example 1.—1-benzyl-3-acetyl-5-(3′-amyl) tetramic acid*

5.5 g. of diethylalanine are mixed with 3.6 g. of benzaldehyde in methanol with one equivalent of potassium hydroxide and this mixture is hydrogenated in the presence of a palladium catalyst at room temperature, starting at 40 p.s.i.g. The reaction is complete when one molar equivalent of hydrogen based on benzaldehyde is absorbed. The catalyst is then removed by filtration, and the solution is neutralized with concentrated hydrochloric acid, and filtered quickly to remove the precipitated potassium chloride. N-benzyl diethylalanine crystallizes from the filtrate in 6.86 g. yield. Melting point 240–242° C. with sublimation.

*Analysis.*—$C_{14}H_{21}NO_2$. Calc.: C, 71.45; H, 8.99; N, 5.95. Found: C, 71.76; H, 11.44; N, 5.32.

2.35 g. of N-benzyl diethylalanine is dissolved in one equivalent of sodium hydroxide and cooled in an ice bath. 1.82 g. of diketene is added with agitation. After one hour the solution is extracted with ether. Crystalline N-acetoacetyl-N-benzyl diethylalanine is recovered by acidifying the aqueous solution with dilute hydrochloric acid. After recrystallization from ethyl acetate, the product has a melting point of 129–131° C.

*Analysis.*—$C_{18}H_{12}NO_4$. Calc.: C, 67.69; H, 7.89; N, 4.39. Found: C, 67.78; H, 7.96; N, 4.11.

A quantity of the above acid, 3.06 g., is converted to the methyl ester by treating with an excess of diazomethane in ether solution, while cooled in an ice water bath, until a yellow color remains. The excess diazomethane is evaporated under a stream of nitrogen and the ether concentrated to yield the oily ester. Approximately 0.0115 mole of sodium in 5 ml. methanol is added to the acetoacetyl ester in 20 ml. benzene and the solution refluxed on a steam bath for 3 hours. The benzene is decanted and the residue triturated with ether to give a crude sodium salt. The crude sodium salt of the product, 1-benzyl-3-acetyl-5-(3′-amyl) tetramic acid, is dissolved in water, neutralized with sulfuric acid to obtain the free acid which is then extracted into ether. The ether extract is washed, dried, and reconverted to the sodium salt by back extracting with a calculated amount of sodium bicarbonate. The aqueous layer is lyophilized to yield the solid sodium salt. U.V. in methanol at pH 7 $\lambda_{max}$. 2480 and 2850. At pH 1 $\lambda_{max}$. 2830.

*Example 2.—Potassium-1-methyl-3-acetyl-5-sec. butyl tetramate*

3.5 g. (0.24 mole) of N-methyl L-isoleucine in 9.7 ml. of 2.5 N NaOH in about 50 ml. of water is cooled in an ice bath and 2.23 g. of diketene added thereto. At this time the solution is neutral. The solution is extracted once with ether and the aqueous solution acidified and extracted three times with ether. The ether extracts from the acidified aqueous solution are combined and washed twice with water, dried with magnesium sulfate, and concentrated. Yield is 5 g. of N-acetoacetyl N-methyl L-isoleucine.

*Analysis.*—$C_{38}H_{38}N_4O_8$. Calc: C, 65.30; H, 8.36; N, 8.02. Found: C, 65.52; H, 8.14; N, 7.95.

The above product is next converted into the methyl ester by reaction with an excess of diazomethane in an ice bath. The resulting solution is dried over magnesium sulfate and concentrated to yield 5 g. of the methyl ester of the foregoing acid. This is then dissolved in 15 ml. of methanol and 15 ml. of benzene. A solution of 0.54 g. of sodium in about 5 ml. of methanol is added and the mixture refluxed for three hours. The solution is concentrated and the product precipitated with ether. The sticky residue is dissolved in water, acidified with hydrochloric acid, and extracted with petroleum ether three times. The ether solution is washed with water until free of hydrochloric acid, dried over magnesium sulfate, and potassium-2-ethylhexanoate in methyl isobutyl ketone added thereto. A precipitate thereupon forms which is triturated with ether and then with acetone to yield 2.87 g. of crystalline potassium-1-methyl-3-acetyl-5-sec. butyl tetramate.

*Analysis.*—$C_{11}H_{10}NO_3K$. Calc: C, 53.03; H, 6.46; N, 5.62. Found: C, 53.21; H, 6.35; N, 5.43.

*Example 3.—1-benzyl-3-acetyl-5-isopropyl tetramic acid*

5.85 g. (0.05 mole) of valine is dissolved in about 150 ml. of methanol containing 2.8 g. (0.05 mole) of potassium hydroxide. 5.3 g. (0.05 mole) benzaldehyde is added and the solution is shaken with hydrogen at room temperature in a pressure bottle using palladium on carbon as a catalyst, following the procedure of Example 1. The product starts to crystallize in about 3 hours and the hydrogenation is terminated. The precipitate is redissolved by heating the reaction mixture on a steam bath, and the clear solution was filtered from the catalyst and neutralized with one equivalent of concentrated hydrochloric acid to give immediate crystallization of N-benzyl L-valine in 91% yield.

2.07 g. (0.01 mole) of N-benzyl valine is dissolved in 50 ml. of water containing 0.8 g. (0.02 mole) of sodium hydroxide and 0.84 g. (.001 mole) of diketene is added to the solution while stirring in an ice bath. The solution is extracted once with ether and the remaining aqueous solution acidified with dilute hydrochloric acid. The solid, N-acetoacetyl N-benzyl valine, precipitates. After recrystallization from ether its melting point is 115° C.

The above acid is esterified with diazomethane and ring closure effected with sodium methoxide and the product worked up as described in Example 2 to yield 1-benzyl-3-acetyl-5-isopropyl tetramic acid, potassium salt; U.V. in MeOH $\lambda_{max.}$ at pH 7, 2470, 2840; $\lambda_{max.}$ at pH 1, 2820.

*Example 4.—N-benzyl-3-acetyl-5-sec. butyl tetramic acid*

The N-benzyl derivative of L-isoleucine is prepared by following the procedure given in Example 3, using equivalent amounts of L-isoleucine in place of valine. Acetoacetylation, esterification, and ring closure are effected as therein indicated. The product, N-benzyl-3-acetyl-5-sec. butyl tetramic acid, potassium salt, has the following characteristics: U.V. in MeOH $\lambda_{max.}$ at pH 7, 2470, 2840; $\lambda_{max.}$ at pH 1, 2820.

*Example 5.—1-benzyl-3-acetyl-5-(3'3'3'-trifluoro-n-propyl) tetramic acid*

1 - benzyl - 3 - acetyl - 5 - (3'3'3'-trifluoro - n - propyl) tetramic acid is prepared in the same manner as described in Example 3, using equivalent amounts of 5,5,5-trifluoro norvaline instead of valine. The product has a melting point of from 73–76° C.

*Example 6.—1-benzyl-3-acetyl-5-phenyl tetramic acid*

5.49 g. of α-phenyl glycine is dissolved in 150 ml. of methanol in which 2.2 g. of potassium hydroxide is present. 4.2 g. of benzaldehyde is added and the mixture is hydrogenated with platinum catalyst in accordance with the procedure of Example 1. The resulting solution is filtered from the catalyst and neutralized with concentrated hydrochloric acid to yield N-benzyl-α-phenyl glycine as a crystalline precipitate. After recrystallization with methanol, the precipitated N-benzyl-α-phenyl glycine has a meltitng point of about 225° C.

2.27 g. of the above product is dissolved in 50 ml. of water containing 0.8 g. of sodium hydroxide. 0.84 g. of diketene is added to the solution while stirring in an ice bath. After ½ hour, the solution is extracted with ether and the aqueous solution is acidified to yield N-acetoacetyl-N-benzyl-α-phenyl glycine as a precipitate.

*Analysis.*—$C_{16}H_{21}NO_4$; Calc: C, 65.95; H, 7.27; N, 4.81. Found: C, 65.67; H, 7.01; N, 5.05.

The above product is esterified in ether with diazomethane and ring closure effected as described in Example 2. The product, 1-benzyl-3-acetyl-5-phenyl tetramic acid, has the following characteristics.

*Analysis.*—$C_{19}H_{17}NO_3$. Calc: C, 74.25; H, 5.58; N, 4.56. Found: C, 74.40; H, 5.67; N, 4.18. U.V. in MeOH $\lambda_{max.}$ at pH 7, 2490, 2860; $\lambda_{max.}$ at pH 1, 2830.

*Example 7.—1-benzyl-3-carboethoxy-5-sec. butyl tetramic acid*

N-benzyl-isoleucine is esterified by dissolving the acid in ethanol to which 100% excess of thionyl chloride has been added based on the amount of acid and refluxing for two hours. The resulting solution is concentrated by vacuum, the residual ethyl ester hydrochloride is dissolved in ether and is crystallized by adding benzene thereto; M.P., 185° C. with sublimation.

To 29 g. of N-benzyl-isoleucine ethyl ester hydrochloride in 100 ml. of pyridine, cooled in an ice bath, 15.4 g. of carboethoxy acetyl chloride is added dropwise. After stirring for about ½ hour, the mixture is concentrated and the residue taken up in ice water. The product separates as an oil and is extracted into ether. The ether extract is washed with dilute hydrochloric acid and water, dried over magnesium sulfate, and concentrated to yield 17 g., (47% overall yield) of the diethyl ester of carboxyacetyl isoleucine.

17 g. of the above ester, is treated with 1.26 g. of sodium dissolved in 15 ml. of ethanol in 50 ml. of benzene. After refluxing for three hours, the solution is decanted, the residue dissolved in water, acidified with hydrochloric acid and extracted into ether. The ether solution is washed with water, dried over magnesium sulfate, and concentrated to yield 12.3 g. (86% yield) of 1-benzyl-3-carboethoxy-5-sec. butyl tetramic acid; M.P., 185–192° C. with sublimation. The copper salt of the above acid is prepared by dissolving the acid in one equivalent of sodium hydroxide and treating the solution dropwise with aqueous cupric acetate. A green precipitate forms which is recrystallized from ethanol-water mixture.

*Analysis.*—$C_{18}H_{22}NO_4$ ½ Cu. Calc: C, 60.53; H, 6.21; N, 3.92. Found: C, 60.48; H, 6.17; N, 3.67.

*Example 8.—1-benzyl-3-carboxamido-5-sec. butyl tetramic acid*

1 g. of the carboethoxy compound derivative produced in Example 7 is heated for 12 hours in 40 ml. of liquid ammonia and 7.5 ml. of ethanol at 100° C. in a pressure bomb. The resulting solution is concentrated to dryness and the residue dissolved in water, acidified with hydrochloric acid, and extracted into ethylacetate. The resulting solution is dried with magnesium sulfate and concentrated to dryness. The residue, 1-benzyl-3-carboxamido-5-sec. butyl tetramic acid is recrystallized from ether and has a melting point of 145–148° C.

*Analysis.*—$C_{16}H_{20}N_2O_3$. Calc: C, 66.64; H, 6.95; N, 9.72. Found: C, 66.22; H, 6.73; N, 9.68.

*Example 9.—1,5-diphenyl-3-acetyl tetramic acid*

4.67 g. of ethyl-α-anilino-α-phenylacetate is dissolved in benzene, treated with 1.74 g. of diketene, heated on a steam bath and allowed to stand overnight. The solution is then concentrated to an oily residue which is washed with hot hexane to yield about 250 mg. of N-acetoacetyl-N-phenyl-α-phenyl glycine, ethyl ester. 700 mg. of this ester is ring closed by refluxing the ester with one equivalent of magnesium dissolved in 0.5 ml. of ethanol all in 10 ml. of benzene. After concentration to dryness and acidification of the residue with dilute hydrochloric acid, the product, 1,5-diphenyl-3-acetyl tetramic acid, is obtained; M.P., 136–138° C.

*Analysis.*—$C_{18}H_{15}NO_3$. Calc: C, 73.70; H, 5.16; N, 4.77. Found: C, 74.19; H, 5.40; N, 4.83; M.W.: 293.33.

*Example 10*

The antibacterial activity of the various compounds listed below is determined by using the assay method of E. O. Stapley, Applied Microbiology, 6, 392–8 (1958). The compounds are assayed as aqueous solutions at a concentration of 2 mg./ml. in pH 5, M/20 phosphate buffer. Five ml. of nutrient agar containing 0.2% of yeast extract is placed in a Petri dish and seeded with the microorganism indicated in Table I below. A ¼ inch (6.4 mm.) paper disc is placed on the agar, soaked with droplets of the aqueous solutions discussed above, and the entire assembly allowed to incubate overnight at 25° C. The area of the agar medium in which microorganism growth occurs appears cloudy, whereas the area in which no growth occurs remains clear. The diameter of the clear zones are indicative of relative antibacterial efficacy for the compounds tested. The numerical designations in Table I are diameters of zones of inhibitions.

Compounds used in this example:

(I) Potassium-1-methyl-3-acetyl-5-sec. butyl tetramate
(II) Potassium-1-benzyl-3-acetyl-5-isopropyl tetramate
(III) Potassium-1-benzyl-3-acetyl-5-(3'-amyl) tetramate
(IV) Potassium-1-benzyl-3-acetyl-5-sec. butyl tetramate
(V) 1-benzyl-3-acetyl-5-(3'3'3'-trifluoro-n-propyl) tetramic acid
(VI) Sodium-1-benzyl-3-acetyl-5-amyl tetramate
(VII) Potassium-1-benzyl-3-acetyl-5-phenyl tetramate
(VIII) Copper-1-benzyl-3-carboethoxy-5-sec. butyl tetramate
(IX) Potassium-1-benzyl-3-acetyl-5-n-hexyl tetramate
(X) Sodium-1-benzyl-3-carboxamido-5-sec. butyl tetramate

TABLE I.—ANTIBACTERIAL ACTIVITY

| | Zones of Inhibition (Diameters in mm. H=Hazy) | | | | | | | | | |
|---|---|---|---|---|---|---|---|---|---|---|
| | I | II | III | IV | V | VI | VII | VIII | IX | X |
| Escherichia coli | 00 | 07 | 07 | 00 | 00 | 00 | 00 | 00 | 00 | 12 |
| Bacillus sp | 23 | 26 | 28 | 27 | 26 | 31 | 28 | 20 | 37 | 28 |
| Proteus vulgaris | 00 | 07 | 07 | 00 | H 16 | 00 | 00 | 00 | 00 | 11 |
| Pseudomonas aeruginosa | 00 | 07 | 07 | 00 | 00 | 00 | 00 | 00 | 00 | 00 |
| Serratia marcescens | 00 | 07 | 07 | 00 | 00 | 00 | 00 | 00 | 00 | H 10 |
| Staph. aureus | H 13 | 25 | 28 | 28 | 24 | 34 | 34 | 17 | 33 | 29 |
| Bacillus subtilis | 16 | 28 | 28 | 29 | 28 | 35 | 29 | 19 | 33 | 28 |
| Sarcina lutea | 11 | 19 | 24 | 23 | 29 | 29 | 29 | 15 | 28 | 29 |
| Staph. aureus (Strep. resistant strain) | 00 | 22 | 23 | 28 | 22 | 32 | 27 | 13 | 30 | 24 |
| Strep. faecalis | 13 | 15 | 17 | 20 | H 22 | 22 | 22 | 00 | 23 | 19 |
| Alcaligenes faecalis | 12 | 12 | 09 | 15 | H 13 | 10 | 13 | 00 | H 16 | 13 |
| Brucella branchiseptica | 00 | 11 | 08 | 18 | 20 | H 11 | 11 | 14 | H 16 | 12 |
| Salmonella gallinarum | 00 | 07 | 07 | 00 | H 11 | 10 | 10 | 00 | 00 | 11 |
| Vibrio percolans | H 11 | 10 | 10 | 15 | 16 | 21 | 12 | 13 | 15 | 10 |
| Xanthomonas vesicatoria | 00 | 07 | 07 | 00 | H 10 | 00 | H 11 | 00 | 00 | H 11 |

As demonstrated in the table, the compouds of the invention have a broad spectrum of antibacterial activity. They also present a good variety of efficacy on particular species. For example, while compound III shows relatively little effect on *Brucella branchiseptica*, compounds IV and V show very good activity against this microorganism.

Example 11

The general procedure of Example 10 is followed using potassium-1-methyl-3-acetyl-5-sec. butyl tetramate (compound I), and potassium-1-benzyl-3-acetyl-5-sec. butyl tetramate (compound IV) against *Bacillus megaterium* and *Bacillus subtilis* microorganisms. The medium is nutrient agar containing 0.2% yeast extract and the above compound is introduced in the amounts given in the following Table II. The inhibitory effect is demonstrated by zone diameters.

TABLE II

| Compound | Microoganism | Wt. of Compound Added to Disc, Gammas | Zone diameter, mm. |
|---|---|---|---|
| I | B. megaterium | 1,200 | 19 |
| | | 600 | 15.5 |
| | | 300 | 13.5 |
| | | 150 | 11.5 |
| I | B. subtilis | 1,500 | 25 |
| | | 937 | 22 |
| | | 586 | 19.5 |
| | | 366 | 18.5 |
| | | 229 | 16.5 |
| | | 143 | 16 |
| | | 89 | 12 |
| IV | B. subtilis | 180 | 22.5 |
| | | 112 | 22.5 |
| | | 70 | 20.5 |
| | | 44 | 10 |
| | | 27.5 | 18 |

Any departure from the above description which conforms to the present invention is intended to be included within the scope of the claims.

What is claimed is:

1. The method for inhibiting the growth of bacteria which comprises contacting a site infected with bacteria with an effective amount of a compound of the formula

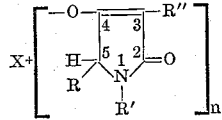

where R is selected from the group consisting of lower-alkyl, fluoro-lower alkyl and phenyl, R' is selected from the group consisting of benzyl, phenyl, and methyl, R" is selected from the group consisting of acetyl, carboxamido, and carboethoxy, X is selected from the group consisting of hydrogen and alkali and alkaline earth metal cations, and $n$ is a whole number corresponding to the valency of X.

2. The method according to claim 1 wherein R' is benzyl.
3. The method according to claim 2 wherein R is lower alkyl.
4. The method according to claim 3 wherein X is an alkali metal.
5. The method according to claim 4 wherein R" is acetyl.

References Cited

UNITED STATES PATENTS 2,824,110  2/1958  Howard ———————— 167—33

ALBERT T. MEYERS, *Primary Examiner.*

D. MAHANAND, *Assistant Examiner.*